Sept. 20, 1966  B. I. DAHLBERG  3,273,790
METHOD AND APPARATUS FOR CENTRIFUGAL SEPARATION OF SUSPENSIONS
Filed June 4, 1964  2 Sheets-Sheet 2
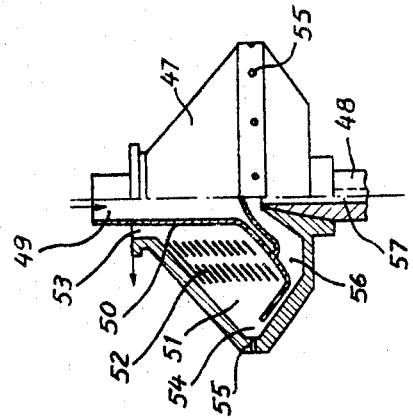
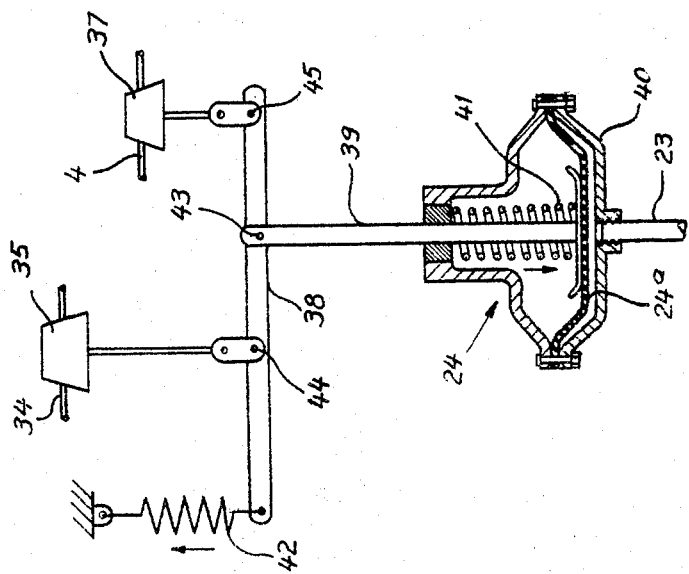
INVENTOR.
Bengt Ingmar Dahlberg
BY
Davis, Hoxie, Faithfull & Hapgood
ATTORNEYS.

United States Patent Office 3,273,790
Patented Sept. 20, 1966

3,273,790
METHOD AND APPARATUS FOR CENTRIFUGAL SEPARATION OF SUSPENSIONS
Bengt Ingmar Dahlberg, Tullinge, Sweden, assignor to Aktiebolaget Separator, Stockholm, Sweden, a corporation of Sweden
Filed June 4, 1964, Ser. No. 372,519
Claims priority, application Sweden, June 12, 1963, 6,456/63
4 Claims. (Cl. 233—18)

This invention relates to the centrifugal separation of suspensions, such as starch-milk, and more particularly to an improved method and apparatus for that purpose.

It has been attempted heretofore to control the concentration of a concentrate discharged through the nozzles of a nozzle separator so that the concentration remains at least approximately constant. In a prior method for this purpose, a measuring liquid is fed into the sludge chamber of the centrifugal rotor through a channel opening into this chamber, and the pressure of the measuring liquid actuates a device which controls the quantity of substance in suspension supplied per unit of time to the separator as disclosed in Swedish Patent No. 153,688. The control can be carried out by controlling the supply of the suspension itself to the inlet of the separator and/or by controlling the recirculation of the concentrate from the nozzle outlet to the inlet of the separator. The pressure of the measuring liquid constitutes a measure of the hydrostatic resistance in the sludge chamber and thus a measure of the degree of concentration of the sludge concentrate.

In the following description of the prior art, it is assumed for the sake of simplicity that the suspension to be separated is constituted by raw starch-milk. The starch concentrate discharge from the nozzles of the separator is normally reseparated in a couple of additional nozzle separators, washwater being fed into the sludge chamber of each separator in order to wash off the solid and soluble impurities from the starch grains. The reseparation is carried out in such way as to increase the concentration of the concentrate. The various separators are adjusted in relation to each other in order to achieve a satisfactory separation result as regards the purity and the concentration of the final product. For that purpose, it is required that the quantity of pure starch passing through each separator per unit of time be kept constant; and the aforementioned system exemplified by said Swedish Patent No. 153,688 is aimed at that objective. It has appeared, however, that a sufficient control accuracy cannot be obtained in that system. This is due to several factors. The water separated in the first separator of the system is directly discharged to the drain. The separation in this first separator is therefore carried out in such way that no starch is carried away in the waste water. This means, however, that the starch concentrate discharged from the nozzles of this first separator has a comparatively low concentration. Such a low concentration results in uncertain readings of the pressure of the measuring liquid and thus an uncertain measure of the quantity of pure starch passing through the separator per unit of time.

According to the method of the present invention, an improved control accuracy is obtained by carrying out the separation of the suspension in two separators connected in series, wherein the measuring liquid is fed to the second separator (reckoned in the direction of the flow path) and the pressure of the measuring liquid in the second separator is used to control the supply of substance in suspension to the first separator. Since it is possible to keep a higher concentration in the second separator than in the first one without any risk of loss of valuable substance, it is possible, by means of the measuring liquid, to obtain a more accurate measure of the quantity of substance in suspension discharged from the separator nozzles per unit of time and thus also a more accurate control of the quantity of substance in suspension which is fed to the first separator per unit of time.

The new apparatus comprises two centrifugal separators of the nozzle type each including a hollow rotor having a separating zone surrounded by a sludge chamber and also having an inlet to this zone, peripheral nozzles for discharging separated sludge from the sludge chamber and a separate outlet for discharging separated liquid from the rotor. The suspension to be separated is fed to the inlet of the first rotor by conduit means including a feed control device, such as a valve, operable to vary the proportion of solids in the suspension. A pipe line is provided for conveying separated sludge from the nozzles of the first rotor to the inlet of the second rotor, the latter having a separate inlet passage leading to the sludge chamber of the second rotor. The apparatus also comprises means including an auxiliary feed pipe for feeding liquid at a constant rate under pressure to this inlet passage, and an operative connection between the auxiliary feed pipe and the control device for operating the latter to decrease the proportion of solids in the suspension going to the first rotor in response to a pressure increase in the auxiliary feed pipe.

The invention is described in more detail below, reference being made to the accompanying drawings, in which—

FIG. 2 is a side elevational view, partly in section, of one of the centrifugal rotors of the separators shown in FIG. 1; and FIG. 3 is a detail view, partly in section, of the control valves and their pressure-responsive actuator shown in FIG. 1.

Figure 1:
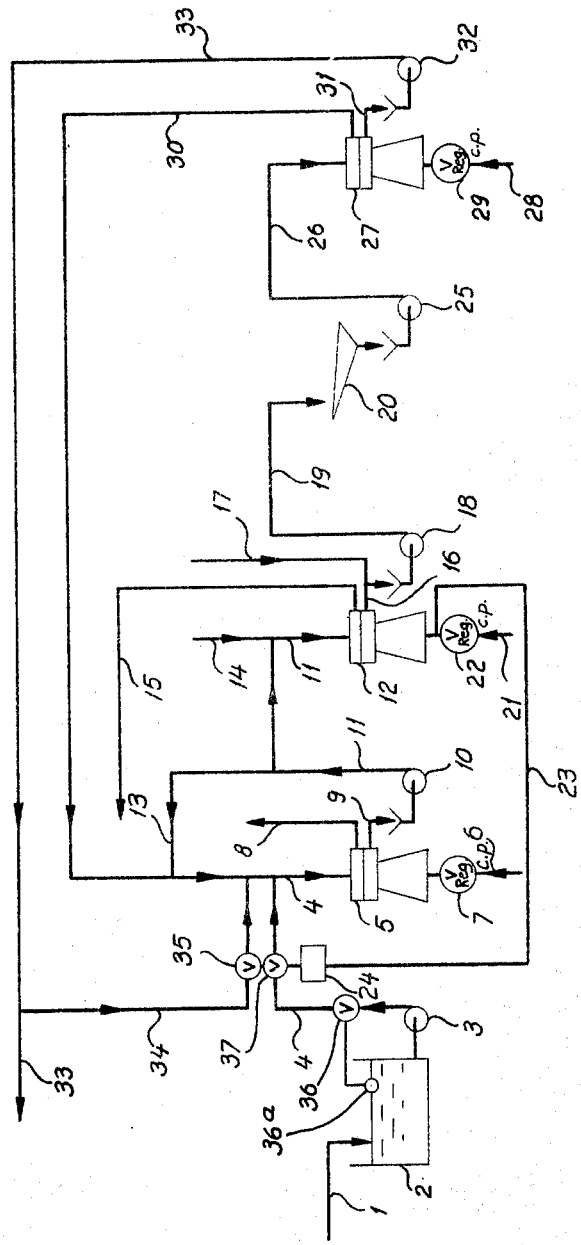
FIG. 1 is a schematic view of a preferred form of the new apparatus, which will be described for illustrative purposes in connection with the separation of raw starch-milk.

Raw starch-milk is extracted from potatoes and fed through a pipe 1 to a container 2. From this container the starch-milk is fed by a centrifugal pump 3 through a pipe 4 into a centrifugal separator 5 of the nozzle type. Water is fed to the sludge chamber of the separator 5 by a pipe 6 having a valve 7 of the type which allows for the passage of a constant quantity of water per unit of time. Separated water which contains fibers but no starch is discharged through an outlet 8 from separator 5 and starch concentrate (sludge) released through the nozzles is discharged through an outlet 9. The starch concentrate, the concentration of which is comparatively low, is fed by a centrifugal pump 10 through a pipe line 11 into a second nozzle separator 12. A part of the starch concentrate is returned through a pipe 13 to the inlet of the separator 5, whereby the concentration of the concentrate discharged through the outlet 9 is increased. Pure dilution water is fed to the separator 12 through a pipe 14, so that the concentrate coming from the separator 5 can be further purified during its reseparation. The water separated in the separator 12 contains further solid impurities as well as some starch, and this separated water is discharged through an outlet 15 to the plant (not shown) where the starch-milk is extracted from the potatoes and where this water is used as dilution water. Starch concentrate (sludge) separated in the separator 12 is discharged through an outlet 16. Pure dilution water conveyed through a pipe 17 is added to this concentrate, which is fed by a centrifugal pump 18 through a pipe 19 to a strainer 20.

Washwater, which at the time time serves as measuring water, is fed into the sludge chamber of the separator 12 through a pipe 21 provided with a valve 22 of the same kind as the valve 7. A pipe 23 is branched off from the pipe 21 between the valve 22 and the separator 12 and transmits the pressure-variation impulses to a pressure-responsive actuator 24.

On the strainer 20 a further quantity of fibers is separated from the strach grains which pass through the strainer, from which they are fed by a centrifugal pump 25 through a pipe 26 to a nozzle separator 27. There the starch is once more washed with pure water which is fed into the sludge chamber of the separator through a pipe 28 provided with a valve 29 of the same kind as the valve 7. Separated water discharged from separator 27 and containing some starch is reconveyed through pipe 30 to the inlet of the separator 5 where it is used as dilution water. Pure starch concentrate is discharged from the nozzle outlet 31 of the separator 27 and is delivered by a centrifugal pump 32 through a pipe 33. A pipe 34 is branched from the pipe 33 and leads to the inlet of the separator 5, the pipe 34 having a throttling valve 35.

A throttle valve 36 in pipe 4 is operated by a float 36a in container 2, so as to maintain a constant liquid level in the container. A valve 37 is located in pipe 4 between the float valve 36 and separator 5, and this valve 37 is normally kept fully open by the pressure-responsive actuator 24. Thus, a substantially constant quantity of starch-milk is fed per unit of time to separator 5.

As shown in FIG. 3, the pressure-responsive actuator 24 comprises a housing 40 containing a diaphragm 24a which is biased downward by a spring 41. The housing space below the diaphragm is closed except for a central opening through the bottom of the housing in which one end of pipe 23 is threaded. A spindle 39 extends upwardly from diaphragm 24a and through the top of housing 40, the upper end of the spindle being pivotally linked at 43 to a lever 38. At opposite sides of pivot 43 the lever 38 is pivotally connected to the spindles of the valves 35 and 37, as shown at 44 and 45, respectively. A tension spring 42 urges one end of the lever upwardly around pivot 43, in the direction to close valve 35 and open valve 37.

Thus, when the water pressure in pipe 23 decreases, spring 41 depresses the diaphragm 24a and draws the spindle of valve 37 downward to open it fully (if it is not already fully open), the spindle of valve 35 then being drawn downward against the action of spring 42 to open opening the valve 35. When the water pressure in pipe 23 has dropped below a certain value, the valves 35 and 37 are fully open so that a maximum quantity of starch is supplied per unit of time through pipe 4 to the centrifugal separator 5. As the water pressure in pipe 23 increases, it pushes spindle 39 upward against spring 41 so as to allow spring 42 to swing lever 38 clockwise around pivot 43, until valve 35 is fully closed. During this operation, valve 37 is kept fully open due to the swinging action. Thereafter, further upward movement of spindle 39 causes lever 38 to swing counter-clockwise around pivot 44 (which is now in its uppermost position), thereby raising the pivot 45 against the action of spring 42 and throttling the valve 37.

Each of the separators 5, 12 and 27 is of the known type having a hollow centrifugal rotor provided with peripheral discharge nozzles leading from a sludge chamber, as shown generally in FIG. 2. Referring to FIG. 2, the rotor 47 (forming a locus of centrifugal force) is driven about a central vertical axis by rotation of a hollow spindle 48 on which the rotor is mounted. The starch-milk or suspension is fed into the rotor at its top through an inlet 49 and passes through the usual distributor 50 into the separating zone 51 provided with a conventional set of conical discs 52. The separated liquid discharges through an upper outlet 53 near the rotor axis, while the separated solids pass to a peripheral sludge chamber 54 from which they discharge as sludge through peripheral nozzles 55. The lower portion of distributor 50 forms with the bowl bottom a separate inlet passage 56 leading into the sludge chamber 54, and this passage 56 communicates at the axial portion of the bowl with feed passage 57 formed by the hollow spindle 48.

It will be understood that the spindle passage 57 receives liquid from one of the pipes 6, 21, and 28 (FIG. 1); the rotor inlet 49 receives the suspension from one of the pipes 4, 11 and 26; the outlet 53 delivers separated liquid to one of the pipes 8, 15 and 30; and the nozzles 55 deliver sludge to one of the pipes 9, 16 and 31.

The liquid fed to the spindle passage 57 of each rotor 47 flows at a constant rate through the separate inlet passage 56 to the sludge chamber 54 where it reduces somewhat the concentration of the separated solids. The liquid pressure in passages 56-57 will, of course, depend upon the concentration of the solids in this sludge chamber. That is, as the sludge in chamber 54 acquires a higher concentration of solids it imposes a greater resistance to the liquid flow through passages 56-57, thereby increasing the liquid pressure in these passages and in the discharge end of the liquid feed pipe 6, 21 or 28; and vice versa. However, the sludge in chamber 54 of the second separator 12 will have a substantially higher concentration of solids than the sludge in the corresponding chamber of the first separator 5, as pointed out previously, so that the discharge pressure in pipe 21 will be more responsive to changes in the solids concentration than the discharge pressure in pipe 6.

In the operation of the system as illustrated, if the concentration of the starch concentrate in the sludge chamber of separator 12 falls below the normal value, the water coming from valve 22 encounters a reduced hydrostatic pressure so that the pressure in the discharge end of pipe 21 decreases. This pressure reduction is communicated through pipe 23 to the pressure-responsive actuator 24 so as to increase the flow rate through valve 35, as previously described, thereby increasing the proportion of solids or starch in the feed to separator 5 and counteracting the reduced concentration of starch in the sludge chamber of separator 12. Conversely, the valve 35 will be operated to decrease the proportion of starch in the feed to separator 5 when the starch in the sludge chamber of separator 12 becomes overconcentrated. These changes in the concentration of the starch concentrate in the second separator 12 may occur, of course, as a result of a decrease or increase in the starch percentage of the starch-milk coming from the container 2; but whatever their cause, they are automatically compensated by the resulting pressure changes transmitted through the operative connection 23-24 from the auxiliary feed pipe 21 of the second centrifuge to the valves 35 and 37 for controlling the feed of the suspension to the first centrifuge.

If the starch percentage of the starch-milk coming from container 2 increases to a great extent beyond the normal value, the actuator 24 will first close valve 35 completely and will then throttle the valve 37 until the required concentration balance in the separator 12 is restored.

The pipes 4, 30 and 34 in effect constitute conduit means leading to the inlet of the first separator 5 for feeding a suspension thereto, the valves 35 and 37 of the conduit means forming a control device operable to vary the proportion of solids in the suspension thus fed.

I claim:

1. In the centrifugal separation of a suspension of solids in a liquid, the method comprising the steps of feeding the suspension to a separating zone of a first locus of centrifugal force and there separating the suspension into liquid and sludge, discharging the separated liquid from said locus while separately discharging a relatively low concentration of said sludge through nozzles from a sludge chamber of the locus surrounding said zone, feeding discharged sludge from said first locus to a separating zone of a second locus of centrifugal force and there separating it into liquid and sludge, discharging said second-separated liquid from the second locus while separately discharging a relatively high concentration of said second-separated sludge through nozzles from a sludge chamber of the second locus surrounding said zone thereof, supplying a measuring liquid separately and at a constant rate under pressure to said sludge chamber of the second locus by way of a closed path, whereby the pressure in said path increases with increased concentration of the sludge in said sludge chamber of the second locus, and varying the proportion of solids in said suspension fed to the first locus in response to changes in the pressure in said path to counteract variations in the concentration of said sludge discharged from the second locus.

2. The method according to claim 1, in which said suspension fed to the first locus is made up of converging streams having different respective proportions of said solids in suspension, said variation in the proportion of solids in the fed suspension being effected by varying the flow rate of one of said streams.

3. Apparatus for centrifugally separating a suspension of solids in a liquid, said apparatus comprising the combination of first and second centrifugal separators each including a hollow rotor forming a separating zone and a sludge chamber surrounding said zone, each rotor having an inlet to said zone and also having peripheral nozzles for discharge of separated sludge from said chamber and a separate outlet for discharging separated liquid from said zone, conduit means leading to said inlet of the first rotor for feeding the suspension thereto, said conduit means having a feed control device operable to vary the proportion of solids in the suspension fed to the first rotor, a pipe line for conveying separated sludge from said nozzles of the first rotor to the inlet of the second rotor, said second rotor having a separate inlet passage leading to the sludge chamber of said second rotor, means including an auxiliary feed pipe for feeding liquid at a constant rate under pressure to said inlet passage; whereby the pressure in said feed pipe increases with increased concentration of sludge in said chamber of the second rotor, and an operative connection between said auxilary feed pipe and said control device for operating said device to decrease the proportion of solids in said suspension in response to a pressure increase in said feed pipe.

4. Apparatus according to claim 3, in which said control device includes a valve in said conduit means, said operative connection including a pressure responsive-actuator connected to the valve and a pipe connecting said feed pipe to said actuator.

References Cited by the Examiner
UNITED STATES PATENTS

| | | | |
|---|---|---|---|
| 2,105,217 | 1/1938 | Kelling | 127—24 X |
| 2,488,747 | 11/1949 | Strezynski | 127—69 |
| 2,760,889 | 8/1956 | Peltzer | 127—68 |
| 2,963,219 | 12/1960 | Palmqvist et al. | 233—18 |

M. CARY NELSON, *Primary Examiner.*

H. KLINKSIEK, *Examiner.*